March 26, 1940.   W. G. KÖGEL ET AL   2,194,505
REFRIGERATION
Filed Dec. 31, 1936   2 Sheets-Sheet 1

INVENTORS
Wilhelm Georg Kögel
Per Paul Strandberg
BY
E A Fenander their ATTORNEY.

March 26, 1940.  W. G. KÖGEL ET AL  2,194,505
REFRIGERATION
Filed Dec. 31, 1936   2 Sheets-Sheet 2

INVENTORS
Wilhelm Georg Kögel
Per Paul Strandberg
BY
EA Fenander their ATTORNEY.

Patented Mar. 26, 1940

2,194,505

UNITED STATES PATENT OFFICE 2,194,505

REFRIGERATION

Wilhelm Georg Kögel and Per Paul Strandberg, Stockholm, Sweden, assignors, by mesne assignments, to Servel, Inc., New York, N. Y., a corporation of Delaware Application December 31, 1936, Serial No. 118,558 In Germany January 8, 1936

4 Claims. (Cl. 62—119.5)

My invention relates to refrigeration, and more particularly to absorption refrigerating systems of the kind containing an auxiliary agent or pressure equalizing gas.

In absorption refrigerating systems of this kind a liquid refrigerant or cooling agent, such as ammonia, evaporates and diffuses in an evaporator into an auxiliary agent or inert gas, such as hydrogen, with consequent absorption of heat from the surroundings. The resulting gas mixture of ammonia and hydrogen flows from the evaporator to an absorber in which the ammonia is absorbed into liquid absorbent such as water. The inert hydrogen gas is returned to the evaporator and the enriched absorption solution is conducted to a generator. By heating the generator the ammonia is expelled from the absorption solution, liquefied in a condenser, and then returned to the evaporator to complete the refrigerating cycle. The weakened absorption solution from which the ammonia has been expelled is conducted from the generator to the absorber to absorb ammonia gas.

All of the liquid refrigerant supplied to the evaporator does not always evaporate due to variations in load on the evaporator, so that over a period of time a quantity of unevaporated refrigerant passes through the evaporator. In accordance with my invention refrigerant that does not evaporate in the evaporator at one time is accumulated in such a manner that it is immediately available to produce useful refrigeration at another time. I accomplish this by providing an evaporator which is so constructed and arranged that the unevaporated refrigerant which would otherwise pass out of the evaporator is accumulated or stored in the lower part thereof. The accumulation of unevaporated refrigerant in the evaporator is particularly advantageous in that the refrigerant is immediately available for quick freezing to hasten the production of ice cubes or the like. In order that the refrigerating system will operate at a relatively high efficiency even when unevaporated refrigerant is accumulated or stored in the lower part of the evaporator, the usual concentration of refrigerant in the system is preferably increased by an amount which is substantially proportional to the amount of refrigerant that can be accumulated or stored.

Figure 1:
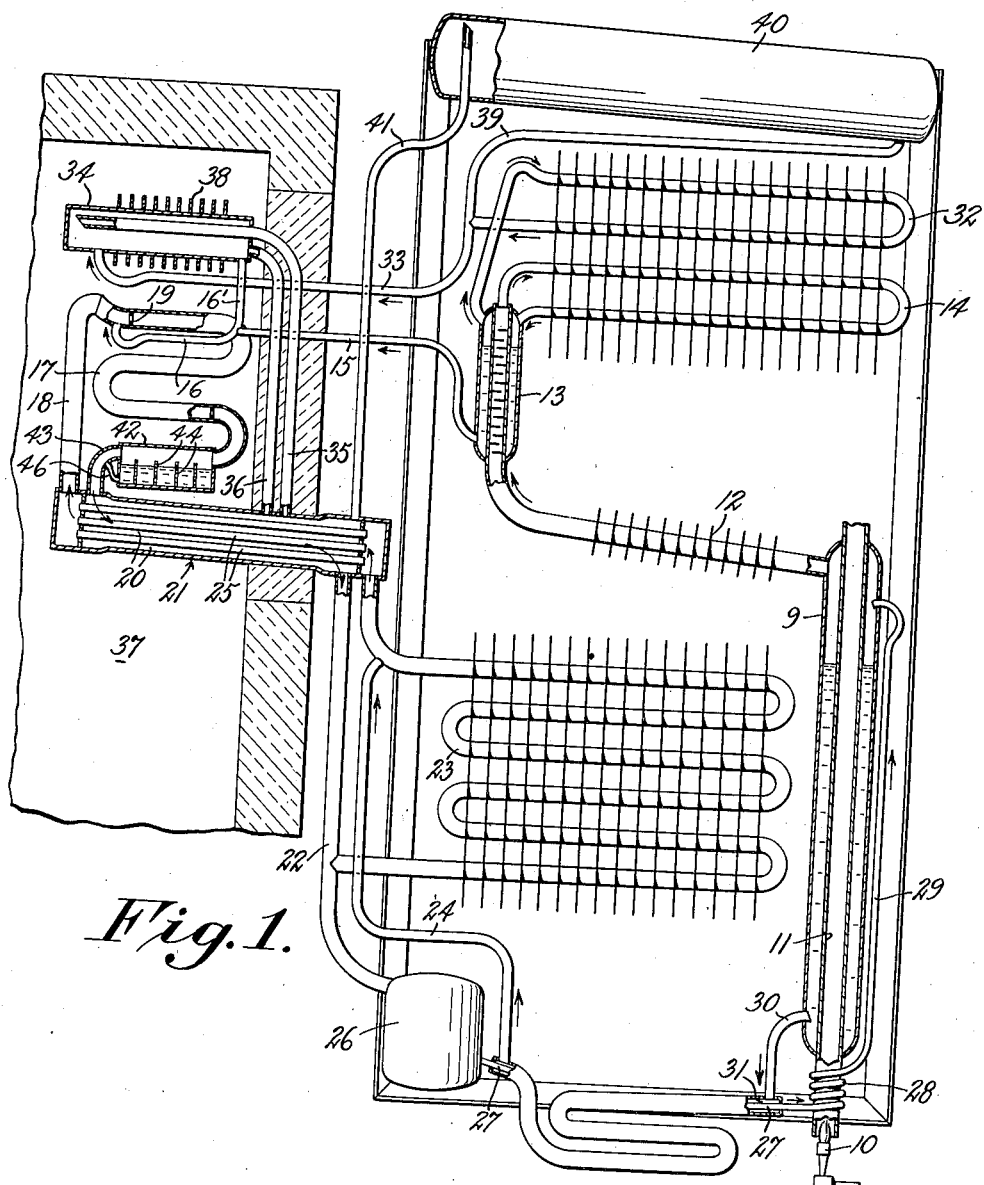
Figure 2:
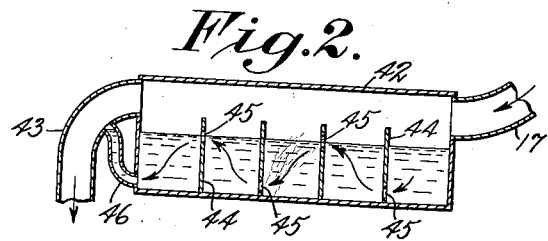
Figure 3:
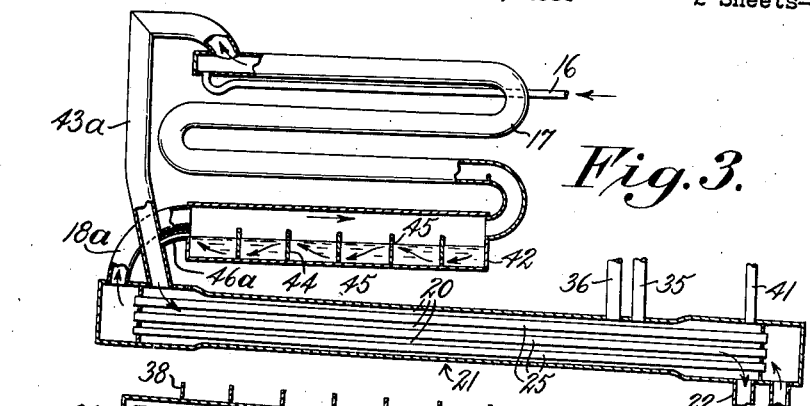
Figure 4:
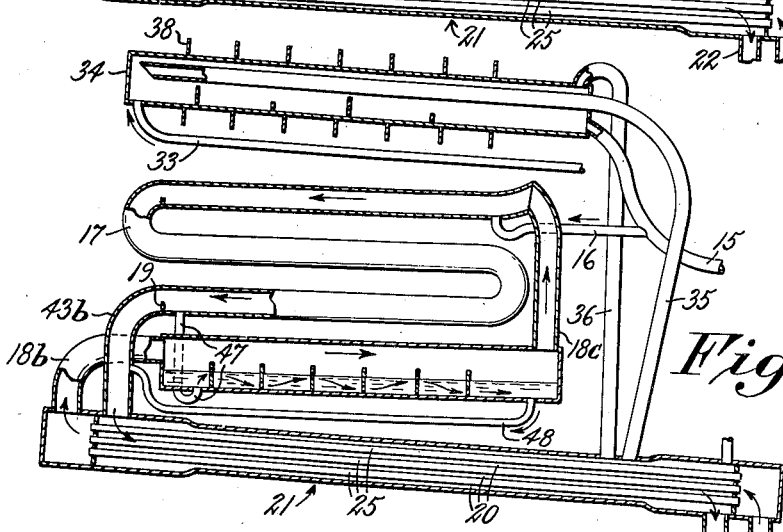
Figures 5, 6:
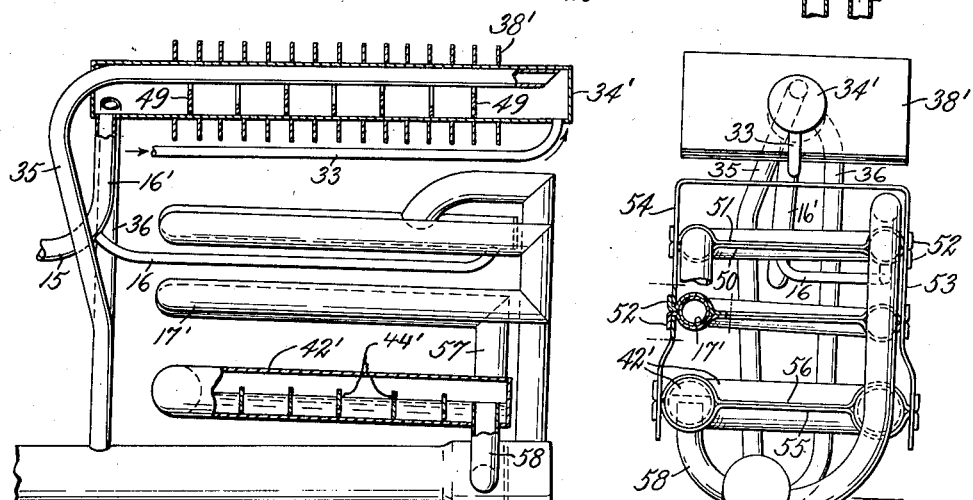

The novel features which I believe to be characteristic of my invention are set forth with particularity in the claims. The invention, both as to organization and method, together with objects and advantages thereof, will be better understood by reference to the following description taken in connection with the accompanying drawings of which Fig. 1 diagrammatically illustrates absorption refrigeration apparatus of a pressure equalized type embodying my invention; Fig. 2 is an enlarged fragmentary sectional view of the evaporator shown in Fig. 1 illustrating more clearly one embodiment of my invention; Figs. 3 and 4 are sectional views of two modifications of the embodiments shown in Figs. 1 and 2; and Figs. 5 and 6 are a side and end elevation, respectively, of a further modification of the invention.

Referring to Fig. 1, I have shown the present improvement embodied in a type of absorption refrigeration system generally like that described in Patent No. 1,609,334 to von Platen and Munters. The refrigerating system comprises a generator 9 containing a refrigerant, such as ammonia, in solution in a body of absorption liquid, such as water. The generator 9 may be heated in any suitable manner, as by a gas burner 10 which is adapted to project its flame into the lower end of a flue 11. The heat applied to the generator 9 and its contents expels the ammonia out of solution, and the ammonia vapor flows upward through the air-cooled rectifier 12 and a liquid cooled rectifier 13 into the lower section 14 of an air-cooled condenser. The ammonia liquefied in the lower section 14 of the condenser flows into the outer jacket of the rectifier 13. Water vapor is condensed in rectifiers 12 and 13 and drains back to the generator 9.

The liquefied ammonia flows from the rectifier 13 through conduits 15 and 16 into the upper end of an evaporator section 17 into which is introduced an auxiliary agent or inert gas, such as hydrogen, from a conduit 18. The evaporator section 17 is of a coil type having disks or inserts 19 which are provided with openings and arranged at spaced intervals therein so that shallow pools of liquid refrigerant are maintained in the entire evaporator section, the refrigerant overflowing and dripping downward therein. The liquid ammonia evaporates and diffuses into the hydrogen with consequent absorption of heat from the surroundings of the evaporator section 17, and the resulting rich gas mixture of ammonia and hydrogen flows from the evaporator section 17 through the outer passage 20 of a gas heat exchanger 21 and conduit 22 into the lower end of an air-cooled absorber 23.

The ammonia is absorbed out of the enriched gas mixture into weak absorption liquid which enters the upper part of the absorber 23 from a conduit 24. The hydrogen, which is practically insoluble and weak in ammonia, passes upwardly from the absorber 23 through a plurality of parallel tubes 25 which form the inner passage of the gas heat exchanger 21, and conduit 18 into the upper end of the evaporator section 17.

The absorption liquid in the absorber 23 becomes enriched in ammonia and passes through the lower end of conduit 22 into a vessel 26. From the vessel 26 the enriched absorption liquid flows through the inner passage 27 of a liquid heat exchanger to a coil 28, and is raised by vapor-lift action through conduit 29 into the upper part of the generator 9. The absorption liquid weak in ammonia flows from the lower part of the generator through a conduit 30, outer passage 31 of the liquid heat exchanger, and conduit 24 into the upper end of the absorber 23.

When the temperature of the cooling air is not sufficiently low to liquefy all of the ammonia vapor in the lower section 14 of the condenser, the ammonia vapor flowing into the outer jacket of the liquid cooled rectifier 13 passes into the upper section 32 of the air-cooled condenser. The ammonia vapor liquefied in the upper section 32 flows through a conduit 33 into an upper evaporator section 34 which is connected by conduits 35 and 36 to the outer passage 20 of the gas heat exchanger 21. Liquid ammonia evaporates and diffuses into the rich gas which circulates through the evaporator section 34 with consequent absorption of heat from the liquid ammonia and the surroundings.

The evaporator section 34 may be employed for cooling a storage space 37 in which both sections of the evaporator are disposed, a plurality of fins 38 being provided on the evaporator section 34 to increase the effective heat transfer surface. The liquid ammonia cooled in the evaporator section 30 flows through conduits 16' and 16 into the upper end of the evaporator section 17 which may be employed as a freezing unit.

The lower end of the upper section 32 of the condenser is connected by conduit 39, vessel 40, and conduit 41 to the gas circuit, so that any hydrogen which may pass through the condenser can flow to the gas circuit and not be trapped in the condenser. Ammonia vapor not liquefied in the condenser will flow through conduit 39 to displace hydrogen in the vessel 40 and force such hydrogen through conduit 41 into the gas circuit, thereby raising the total pressure in the system so that an adequate condensing pressure is obtained for the increased temperature of the condenser.

In accordance with my invention I provide a vessel 42 at the lower end of the evaporator section 17 to accumulate unevaporated refrigerant that passes through the latter. The vessel 42 actually forms a part of the evaporator section 17 and is connected in series relation therewith. The lower end of the coil forming the evaporator section 17 is connected to one end of the vessel 42, and the other end of the vessel is connected by a conduit 43 to the outer passage of the gas heat exchanger 21. The vessel 42 is provided with a plurality of spaced baffles 44 which are considerably higher than the openings in the inserts or disks 19 in the evaporator section 17, adjacent baffles 44 having openings 45 at the upper and lower parts thereof and in staggered relation, as shown most clearly in Fig. 2. To the left-hand end of the vessel 42 is connected an overflow conduit 46 having its lower end connected to the bottom of the vessel and its upper end connected to the conduit 43 at approximately the same height as the upper openings 45 in the baffles 44.

When the refrigerating system is in operation, liquid refrigerant enters the upper part of the evaporator section 17 through the conduit 16 and pools of refrigerant are formed in the evaporator due to the inserts 19. This liquid refrigerant evaporates and diffuses into the inert hydrogen gas which is introduced into the evaporator from the conduit 18. The gas mixture formed gradually becomes richer in ammonia and flows through conduit 43 into the gas heat exchanger 21.

During operation of the refrigerating system the variations in load on the evaporator section 17 may be such that at times liquid ammonia evaporates at a rate which is less than the rate at which liquid ammonia is supplied to the evaporator section 17, and the unevaporated liquid ammonia flows into the right hand pocket or chamber of the vessel 42. If the vessel 42 should contain absorption solution, due to tipping of the apparatus during transportation, for example, the liquid ammonia settles on top of the absorption solution and presses the latter into the second pocket or chamber through the opening 45 at the bottom of the first baffle 44. This raises the level of absorption solution in the second pocket whereby the absorption solution flows through the successive pockets or chambers in the vessel 42 and overflows into the conduit 43 from the conduit 46.

When liquid ammonia enters the second pocket through the bottom opening 45 in the first baffle 44 the liquid ammonia causes a mechanical lifting of absorption solution in the second pocket, due to flow of liquid ammonia and the fact that the absorption solution and liquid ammonia stratify, whereby the absorption solution flows into the next pocket. This pressing downward of absorption solution and mechanical lifting thereof in successive pockets continues until the vessel 42 is purged of absorption solution and the refrigerant assumes a relatively high ammonia concentration which is dependent upon the efficiency of the air-cooled and liquid-cooled rectifiers 12 and 13.

If, for instance, trays containing water to be frozen are inserted into the freezing unit, the load on the evaporator is temporarily increased. Due to this temporary increase in load, more liquid ammonia can evaporate and diffuse into the inert hydrogen gas. By providing the vessel 42, liquid ammonia is immediately available in the freezing unit to take care of the temporary increase in load, and the accumulated liquid ammonia evaporates and diffuses into the inert hydrogen gas with consequent absorption of heat from the surroundings. Thus, the accumulation vessel 42 permits quick freezing in the evaporator section 17 which is utilized as the freezing unit.

The refrigerating system is charged with a quantity of ammonia that will permit the system to operate most efficiently under all operating conditions that are normally encountered. Since liquid ammonia will accumulate in the vessel 42 over a period of time due to variations in load on the evaporator section 17, the concentration of ammonia in the absorption solution is gradually decreased. If a particular refrigerating system operates most efficiently in a normal operating range with a twenty-eight per cent solution of ammonia, for example, the accumulation of ammonia in the vessel 42 will reduce the concentration of ammonia and absorption solution considerably below twenty-eight per cent. In order that the refrigerating system will operate efficiently when liquid ammonia is stored in the vessel 42, the concentration of ammonia in the absorption solution placed in the system is increased to a value which may be thirty-five per cent, for example. This increase in concentration of absorption solution is preferably such that, when the vessel 42 is filled with unevaporated ammonia, the average concentration of ammonia in the absorption liquid circuit of the system will be substantially equal to the concentration which would normally obtain if no accumulation vessel were provided. The size of the accumulation vessel 42 may be varied and should be made sufficiently large in any particular case to take care of any temporary increase in load whereby rapid withdrawal of heat can be immediately effected.

In Fig. 3 I have shown a modification of the embodiment illustrated in Fig. 1 in which quick freezing is accelerated considerably. Instead of introducing the weak gas into the upper end of the evaporator section 17 and having the weak gas in parallel flow with liquid refrigerant, as in the embodiment just described, the modification in Fig. 3 is so constructed and arranged that the weak gas passes from the inner passage 25 of the gas heat exchanger 21 through conduit 18a into the accumulation vessel 42 and flows upward in the evaporator section 17 in counter-flow to the liquid ammonia. The enriched gas mixture passes from the upper end of the evaporator section 17 through conduit 43a into the outer passage 20 of the gas heat exchanger, the overflow conduit 46a from the vessel 42 being connected to the conduit 43a.

By causing the weak gas from the gas heat exchanger 21 to flow over the surface of the low temperature refrigerant in the accumulation vessel 42, the time required to freeze trays containing water or the like is reduced considerably because the partial vapor pressure of the ammonia in the weak gas is relatively low and the liquid refrigerant evaporates and diffuses into the gas at a low temperature with consequent absorption of heat from the surroundings. With this arrangement the gas flowing through the upper part of the evaporator section 17 is richer in ammonia than in the embodiment shown in Fig. 1. However, this is counterbalanced to a great extent in that in Fig. 1 the warm gas from the gas heat exchanger 21 gives up its heat to the upper part of the evaporator section whereas in the modification just described the gas flowing in the upper part of the evaporator section is first cooled in the accumulation vessel 42.

In the modification shown in Fig. 4 the weak gas from the gas heat exchanger 21 flows through conduit 18b into the accumulation vessel 42. Instead of having the gas and liquid refrigerant in counter-flow in the evaporator section 17, however, the gas mixture flows from the vessel 42 through conduit 18c into the upper end of the evaporator section 17 and is in parallel flow or flows in the same direction as the liquid ammonia. The unevaporated refrigerant flows from the lower part of the evaporator section 17 through conduit 47 into the lower end of the vessel 42 which is slightly inclined to the horizontal, and the overflow conduit 48 is connected to the higher end of the vessel and to the conduit 43b.

The modification just described possesses the same advantages as the modification shown in Fig. 3 in that the time required to freeze water or the like in the freezing unit is reduced considerably. By passing the weak gas over the stored liquid ammonia the time required to produce ice cubes and the like has been reduced to as much as 45 per cent of the time required in an evaporator of an ordinary type in which no provision is made for storing unevaporated refrigerant in the evaporator.

One manner of carrying the present invention into practice is shown in Figs. 5 and 6. The upper evaporator section adapted to be used for space cooling comprises a pipe or conduit 34' provided with a plurality of cooling fins 38'. A plurality of inserts 49 may be disposed in the conduit 38' to increase the effective gas and liquid contact surface. The lower evaporator section comprises a looped coil 17' arranged in good thermal contact with plates 50 and 51 which form spaced shelves of a freezing unit. The longitudinal and rear edge portions of each pair of abutting plates 50 and 51 are bent about half the circumference of the coil 17', and the bent tabs 52 provided along the longitudinal edge portions of the plates extend through openings or slots in vertical plates 53 and 54 which form the side walls of the freezing unit.

The accumulation vessel comprises a larger U-shaped conduit 42' which is provided with closed ends and arranged in good thermal contact with abutting plates 55 and 56 in the same manner that the coil 17' is arranged in thermal contact with the plates 50 and 51. The conduit 42' is provided with baffles 44' similar to the baffles 44 in Fig. 2. The lower end 57 of the evaporator coil 17' is connected to one end of the conduit 42' and the other end of this conduit is connected by the overflow conduit 58 to the outer passage of the gas heat exchanger 21.

By providing the U-shaped conduit 42' as the vessel for accumulating unevaporated refrigerant passing through the evaporator coil 17', a relatively large quantity of liquid refrigerant can be stored in the lower part of the freezing unit. Thus, when a tray containing water to be frozen is placed on the shelf formed by the plates 55 and 56, an extremely rapid withdrawal of heat is effected to provide quick freezing for the production of ice cubes.

Instead of providing a separate vessel for storing unevaporated refrigerant passing through the evaporator and utilizing the stored refrigerant for useful refrigeration upon increase in load on the evaporator, the lower part of an evaporator may be provided with inserts of such height that the unevaporated refrigerant cannot pass out of the evaporator. When this is done, however, it is preferable to provide suitable means whereby absorption solution collected in the lower part of the evaporator can be removed therefrom and returned to the absorption solution circuit.

Although particular embodiments of the invention have been shown and described, it will be apparent to those skilled in the art that modifications may be made without departing from the spirit and scope of the invention, as pointed out in the following claims.

What is claimed is:

1. In an absorption refrigeration system having a generator, condenser, absorber and evaporator interconnected for flow of refrigerant, absorption liquid, and inert gas, means to distribute liquid refrigerant in the evaporator in a manner to provide large surface for surface evaporation relative to liquid quantity, means to flow condensate directly onto said distributing means, said evaporator being constructed and connected and said distributing means being disposed for gravity flow of liquid in a downward path, said path being of sufficient length to provide substantially all the surface of evaporation necessary at all refrigerative capacities, and structure providing a pocket of sufficient depth and of such lateral dimensions as to hold a quantity of refrigerant having large volume relative to surface area exposed to inert gas and of such volume as to cause an appreciable variation in concentration of absorption liquid when its complement of refrigerant liquid is added to the absorption liquid in the system, said pocket being situated to receive residue unevaporated liquid flowing downwardly beyond said distributing means and disposed in heat exchange relation with the object to be refrigerated and so that liquid refrigerant in said pocket is in the presence of circulating inert gas.

2. In an absorption refrigeration system as set forth in claim 1, means in said pocket to expel absorption liquid therefrom.

3. In an absorption refrigeration system having a generator, condenser, absorber and evaporator interconnected for flow of refrigerant, absorption liquid and inert gas, means to cause distribution of liquid refrigerant in the evaporator in a manner to provide large surface for surface evaporation relative to liquid quantity, means to flow liquid refrigerant to said evaporator, said evaporator being constructed and connected and said distributing means being disposed for gravity flow of liquid refrigerant in a downward path, and structure providing a pocket of such size and shape as to hold a quantity of liquid refrigerant in the presence of circulating inert gas and of such volume as to cause an appreciable variation in concentration of absorption liquid when its complement of refrigerant liquid is added to the absorption liquid in the system, said pocket being connected to the end of said evaporator toward which liquid refrigerant flows past said distributing means and connected to receive liquid refrigerant beyond said distributing means and disposed in heat exchange relation with the object to be refrigerated, and said distributing means being disposed over a preponderantly major portion of the path of flow of liquid refrigerant provided by said pocket and the portion over which said distributing means extends, and means in said pocket to expel absorption liquid therefrom.

4. An absorption refrigeration system as set forth in claim 1, in which said evaporator is in the form of a pipe coil.

WILHELM GEORG KÖGEL.
PER PAUL STRANDBERG.